July 20, 1948.  E. V. BERGSTROM  2,445,554
HEATER
Filed Dec. 13, 1946
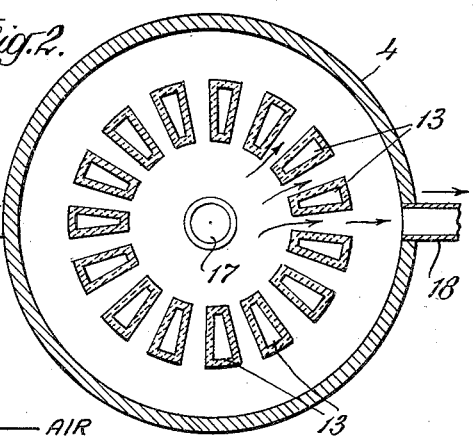
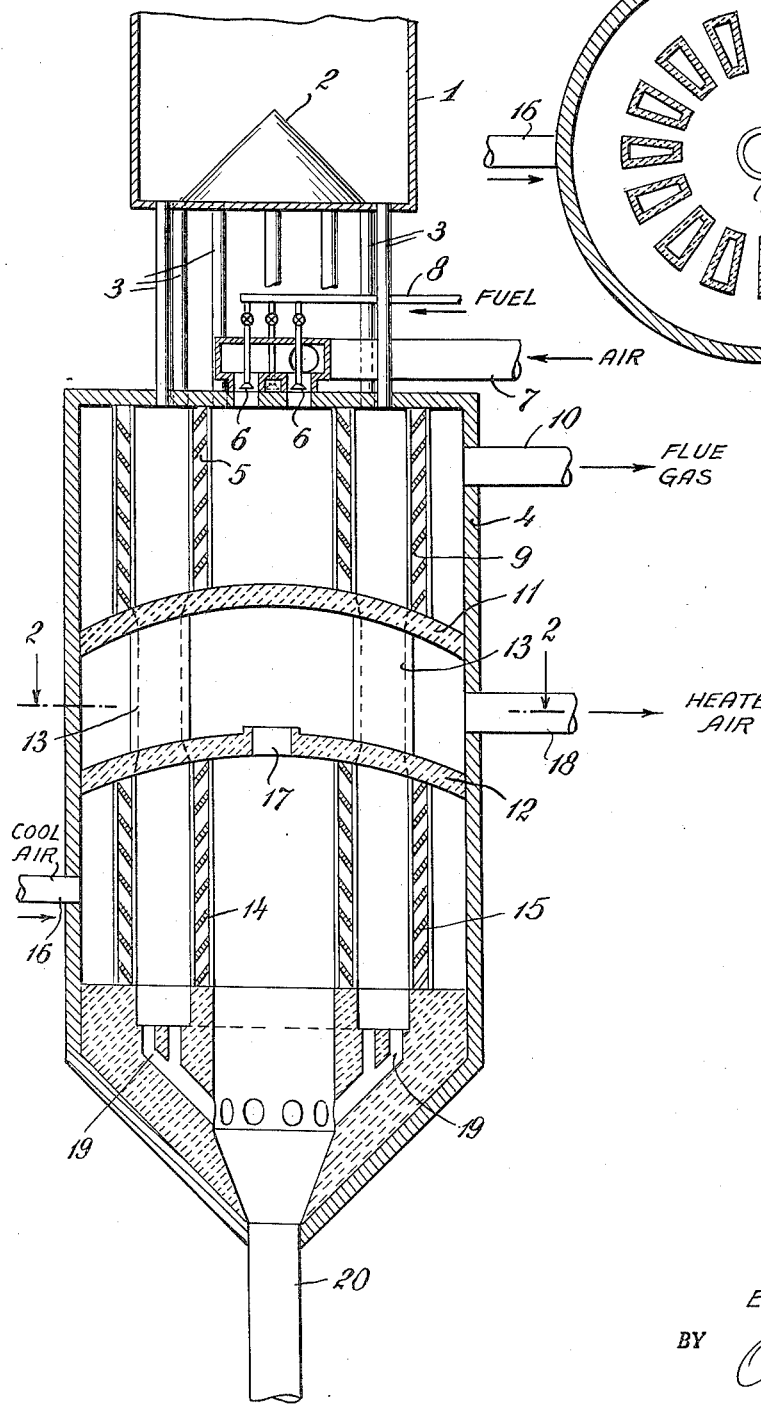
INVENTOR.
ERIC V. BERGSTROM
BY
ATTORNEY

UNITED STATES PATENT OFFICE 2,445,554

HEATER

Eric V. Bergstrom, Short Hills, N. J., assignor to Socony-Vacuum Oil Company, Incorporated, a corporation of New York Application December 13, 1946, Serial No. 716,143

1 Claim. (Cl. 263—19)

This invention relates to apparatus for heating gaseous materials by contact with a highly heated granular solid heat transfer agent.

The invention contemplates a highly efficient transfer of heat from combustion to a gas to be heated by absorbing the heat in a granular solid refractory material and thereafter contacting the granular solid with the gas to be heated. The invention utilizes transverse flow of gaseous media through a downwardly moving compact bed of granular solid and further contemplates transfer of granular solid from a combustion zone to a gas heating zone through tubes which are in heat exchange relationship with the gas to be heated at its maximum temperature. The invention is typified by a preferred apparatus shown in the annexed drawings which represent a vertical section through a typical heater.

The present heater preferably utilizes granular solids in continuous cyclic movement downwardly through a combustion zone and a heating zone in series. The granular solids are withdrawn from the bottom of the heating zone and transferred, as by an elevator not shown, to the top of the combustion zone to repeat the cycle.

A preferred apparatus embodying the principles of the invention is shown in the annexed drawings wherein:

Figure 1 is a vertical section through the heater; and

Figure 2 is a section on line 2—2 of Figure 1.

Granular solids, as for example recycled solids from a suitable elevator, are maintained in a hopper 1 having a conical insert 2 to divert them to a ring of solid feed legs 3 by which they are transferred into a vertical shell 4, enclosing the combustion and heating zones. The granular solids are maintained between louvered walls within a combustion zone in the upper part of the shell 4. An inner louvered wall 5, defines a centrally located combustion zone having suitable burners 6 in the top thereof. Air and fuel are supplied by pipes 7 and 8 to the burners 6 and highly heated products of combustion are thereby generated in the combustion zones. An outer louvered wall 9 defines with wall 5 an annular space down through which the granular solids pass as a continuously moving compact bed. Preferably the inner wall 5 is formed of refractory material when very high temperatures are desired, but the outer wall may be made of steel since the highly efficient heat exchange between the gases and solids results in exhaust gases of temperatures in the neighborhood of the granular solid inlet temperature. Cooled flue gas is exhausted by pipe 10 to the stack.

The elements of the combustion zone are supported by a refractory arch or dome 11 which acts as a partition to set off the combustion zone. A second refractory arch or dome 12 therebelow sets off a treated gas discharge chamber and the granular solids are transferred between the arches through tubes 13 which may be prepared from refractory material for high temperature operation.

Below the arch 12 is an annular wall 14 defining a central space similar to that inside wall 5 of the combustion zone. Similarly, a louvered wall 15 sets off a lower annular space through which the granular solids pass as a compact moving bed. Here again, the inner wall 14 may be formed of refractory where necessary, but the outer wall 15 is generally suitable even though made of carbon steel. A gas to be heated, as for example, air at atmospheric temperature is admitted by pipe 16 to the space about wall 15 from which it passes through the moving bed between the annular walls to the centrally located chamber inside the wall 14. An orifice 17 permits the heated gases to pass the partition 12 and be exhausted by pipe 18 for any desired use.

The cooled solids pass through channels 19 in the base of shell 4 to leave the contacting device by way of pipe 20. The apparatus is so operated that a compact bed is maintained within the combustion and heat exchange zones and free fall of particles is purposely avoided.

I claim:

A heater comprising a vertical shell, two vertically spaced horizontal partitions at adjacent intermediate levels in said shell, the lowermost of said partitions having a central orifice, a first louvered wall in said shell above the uppermost partition surrounding a central combustion zone, a second louvered wall about said first louvered wall defining therewith an upper annular space, means to supply air and fuel to said combustion zone, means to withdraw gases from about said second louvered wall, means to admit granular solid material to the top of said upper annular space, a third louvered wall in said shell below the lowermost partition surrounding a central gas discharge zone communicating with the space between said partitions by way of said orifice, a fourth louvered wall about said third louvered wall defining therewith a lower annular space, means to supply a gas about said fourth louvered wall, means to withdraw gas from the space between said partitions, means to withdraw granular solid from the bottom of said lower annular space, and a plurality of vertical tubes passing through said space between said partitions from the bottom of said upper annular space to the top of said lower annular space for transfer of granular solids therebetween.

ERIC V. BERGSTROM.